United States Patent
Sharma et al.

(10) Patent No.: US 11,227,164 B2
(45) Date of Patent: Jan. 18, 2022

(54) METHODS AND SYSTEMS FOR NEIGHBORHOOD SAFETY

(71) Applicants: Gaurav Sharma, Pittsburg, CA (US); Shobhit Kumar, Roseville, CA (US); Chiranth Kalyanpura, Folsom, CA (US)

(72) Inventors: Gaurav Sharma, Pittsburg, CA (US); Shobhit Kumar, Roseville, CA (US); Chiranth Kalyanpura, Folsom, CA (US)

(*) Notice: Subject to any disclaimer, the term of this patent is extended or adjusted under 35 U.S.C. 154(b) by 167 days.

(21) Appl. No.: 16/589,639

(22) Filed: Oct. 1, 2019

(65) Prior Publication Data

US 2021/0097295 A1   Apr. 1, 2021

(51) Int. Cl.
*G06K 9/00* (2006.01)

(52) U.S. Cl.
CPC ..... *G06K 9/00771* (2013.01); *G06K 2209/15* (2013.01); *G06K 2209/23* (2013.01)

(58) Field of Classification Search
CPC ........... G06K 9/00771; G06K 2209/23; G06K 2209/15
See application file for complete search history.

(56) References Cited

U.S. PATENT DOCUMENTS

| | | | |
|---|---|---|---|
| 2014/0010407 A1* | 1/2014 | Sinha | G06K 9/00664 382/103 |
| 2017/0243479 A1* | 8/2017 | Hill | H04N 7/185 |
| 2017/0278311 A1* | 9/2017 | Vespia | G06Q 50/30 |
| 2018/0268238 A1* | 9/2018 | Khan | G06F 16/583 |
| 2020/0313907 A1* | 10/2020 | Mondello | H04L 9/0825 |

* cited by examiner

*Primary Examiner* — Dhaval V Patel

(74) *Attorney, Agent, or Firm* — Chhabra Law Firm, PC

(57) ABSTRACT

Using various embodiments, methods and systems to provide safeguard a neighborhood or community are described. In one embodiment, a system is configured to receiving a license plate data of a vehicle, fetch indices of a set of known license plate data from a schema object, where the set includes vehicle license plate information of a plurality of vehicles of a neighborhood or community. In one embodiment, the set can be represented in memory using by a binary tree in memory. The system is then configured to sort the binary tree using a tree sorting algorithm. Thereafter, a tree searching algorithm is used to determine whether the license plate data is found in the binary tree. When the license plate data is found in the binary tree, it is determined that the vehicle is known to the neighborhood or community, otherwise it is determined to be not known.

20 Claims, 6 Drawing Sheets

METHODS AND SYSTEMS FOR NEIGHBORHOOD SAFETY

FIELD OF THE INVENTION

Embodiments of the present invention relates generally to safety and security. More particularly, embodiments of the invention relate to software applications to assist in safety and security of a community or neighborhood.

BACKGROUND OF THE INVENTION

Safety and security is generally a concern in any society. Communities and neighborhoods generally create 'neighborhood watch programs', however these programs excessively rely on human action and intervention to prevent crime in the community. As such these tasks can be cumbersome and unreliable. Thus, what is needed are systems and techniques that can safeguard a neighborhood without the drawbacks identified above.

SUMMARY OF THE DESCRIPTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system that is configured to safeguard a neighborhood or community. In this embodiment, the system can be configured to receive a license plate data of a vehicle, fetch indices of a set of known license plate data from a schema object, where the set includes vehicle license plate information of a plurality of vehicles. The set can be represented as a binary tree in memory. The system then sorts the binary tree using a tree sorting algorithm and searches the binary tree using a tree searching algorithm to determine whether the license plate data is found within the binary tree. When the license plate data is not found in the binary tree, it is determined that the vehicle is not known, otherwise the vehicle is determined to be known. Other embodiments of this aspect include corresponding computer systems, apparatus, and computer programs recorded on one or more computer storage devices, each configured to perform the actions of the methods.

Implementations may include one or more of the following features: The system can be further configured to store a timestamp that signifies entry of the vehicle in the neighborhood or community. The system can also include determining that the vehicle has not exited the neighborhood or community within a first predetermined threshold time period and if so, transmit the license plate data of the vehicle to a user device (e.g. mobile device).

In an alternative embodiment, the system can be configured to store a first timestamp value that signifies a time of entry of the vehicle in the neighborhood or community, determine that the vehicle has exited the neighborhood or community within a first predetermined threshold time period. After the determination, the system can store a second timestamp value that signifies a time of exit of the vehicle from the neighborhood or community. The system can then determine a total time the vehicle remained in the neighborhood or community. If the total time exceeds a second predetermined threshold time period, the system can transmit the license plate data of the vehicle to a user device.

In yet another alternative embodiment, the system can further be configured to present a user the option to claim the vehicle, where claiming the vehicle associates the license plate data with a profile of the user and where the user can temporarily claim the vehicle as a guest vehicle.

In one embodiment, the system can be configured to permit the user to add, delete, or modify license plate data of vehicles associated with the profile of the user. In yet another embodiment, the system authenticates the user using a 32-byte secure hash algorithm (SHA-256) based cryptographic hash token that is generated and transmitted to the user. Implementations of the described techniques may include hardware, a method or process, or computer software on a computer-accessible medium.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described can be performed in a different order. Moreover, some operations can be performed in parallel rather than sequentially.

In one embodiment, a community safety application focused safeguarding a community/neighborhood is disclosed. The system can include software, camera(s) and a smartphone application that can inform users in a community about unknown vehicles entering and leaving the neighborhood. The systems and techniques disclosed herein can also be used for through traffic control, speed control, package/vehicle theft and illegal parked cars. In one embodiment, users can be notified of events using 'push notifications'.

The system disclosed herein can use technologies as LPR (License Plate Reader) camera(s), OCR (optical character recognition), object recognition, image analytics, machine learning, or a combination thereof. As non-limiting examples, object recognition can be used to identify different objects in the picture and extract out the objects in different categories such as vehicular data from image of the vehicles, humans, animals. In one embodiment, object recognition techniques used herein identifies the object by converting the image to a standard definition and segregates the image object on the varying density of the image pixels grouped/ungrouped and numbers them in the image. Different methods of segregating the objects using differentiating color schemes, shapes in the image can be implemented. Furthermore, the techniques disclosed herein can be integrated with machine learning techniques to segregate the different objects using different public libraries (e.g., libraries available on Internet).

Figure 1:
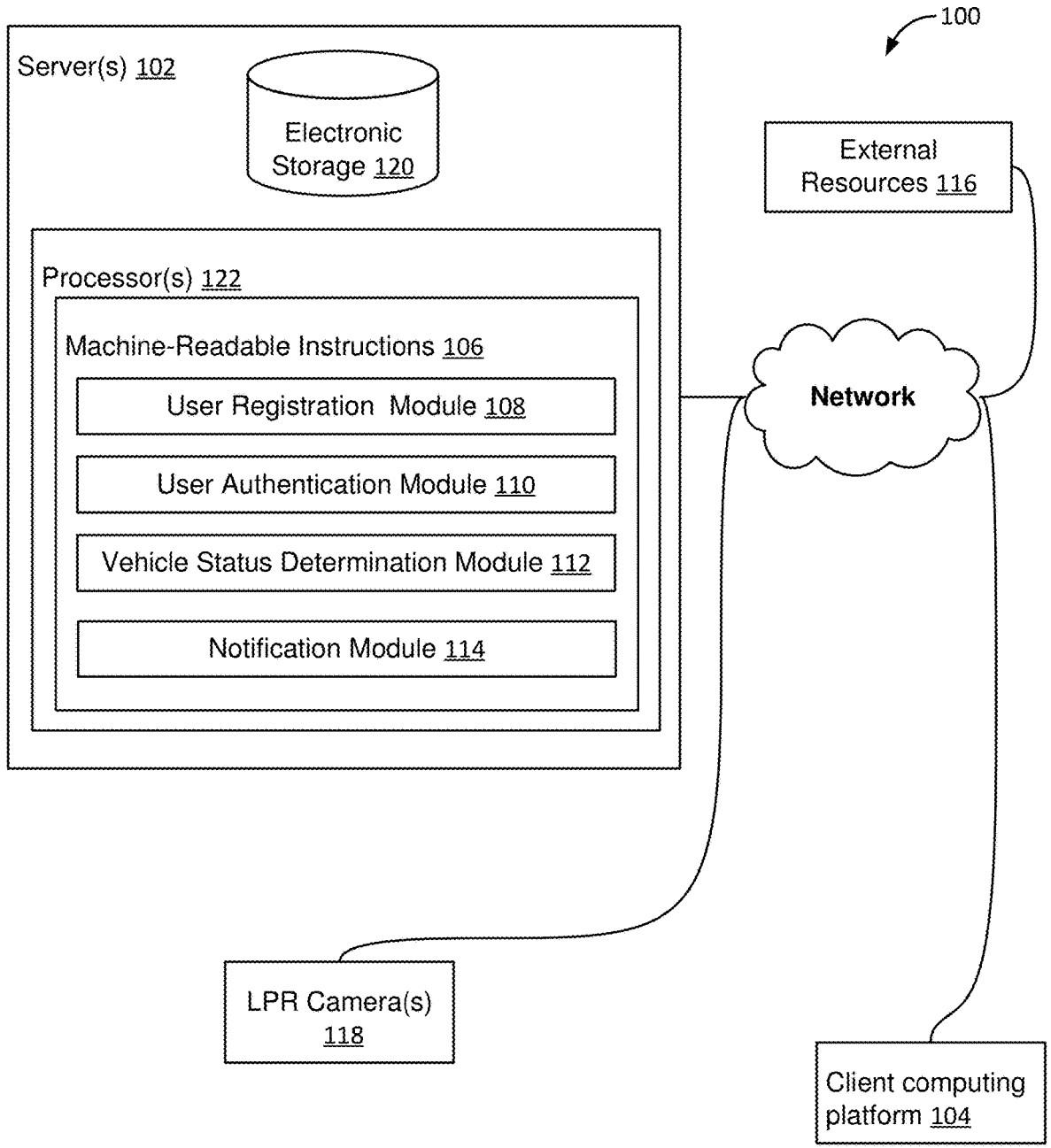
FIG. 1 illustrates a system configured to provide neighborhood safety in accordance with one or more embodiments of the present invention.

FIG. 1 illustrates a system 100 configured to provide neighborhood safety/safeguard a community, in accordance with one or more embodiments of the present invention. In some embodiments, system 100 may include one or more servers 102. Server(s) 102 can be configured to communicate with one or more client computing platforms 104 according to a client/server architecture and/or other architectures. Client computing platform(s) 104 can be configured to communicate with other client computing platforms via server(s) 102 and/or according to a peer-to-peer architecture and/or other architectures Users may access system 100 via client computing platform(s) 104.

Client computing platforms(s) 104 can be configured by machine readable instructions 107. Server(s) 102 can be configured by machine-readable instructions 106. Machine-readable instructions 106 may include one or more instruction modules. The instruction modules for server(s) 102 may include one or more of user registration module 108, user authentication module 110, vehicle status determination module 112, notification module 114, and/or other instruction modules.

In one or more embodiments, user registration module 108 can direct a user to a registration page to create a user profile and enroll to become part of a community. The user can be asked to provide at least one of a community name, name, address, vehicle license plate data/number that is to be associated with their profile. In one embodiment, users can also be provided an option to add guest vehicle license plate data and configure a time period (e.g., hours, days, etc.) after which the system deletes/discontinues use of the information.

As a non-limiting example, an Application Programming Interface (API) can be provided to store the information in electronic storage 120 and tag it as 'guest' or 'owned' by the user in their profile. The API can optionally use the POST method as request and can submit the field to a database.

In one embodiment, after the API transmits the information to server(s) 102, the user can receive an email verification hyperlink that comprises a token. In one embodiment, the token is generated by an SHA-256 based cryptographic hash that generates a 256-bit (32-byte) verification code. Once the user clicks on the link the token is verified by the system and the user is registered.

User authentication module 110 can be configured to authenticate and/or authorize the user and make system resources available to the user. In one embodiment, when a user attempts to login, an authentication API can be used to validate the user. An authenticated user can add/update/delete/maintain their profile and vehicle license plate information in the database. In one embodiment, user authentication module 110 can prevent access to the system if a user unsuccessfully attempts to login after a threshold number of times (e.g., five, eight, ten times, etc.).

Vehicle status determination module 112 can be configured to assist a user in associating a vehicle as their own or of their guests. This includes determining whether a vehicle belongs to a member of a community or whether a vehicle is determined to be suspicious as further described herein.

Once a community user logs in into server(s) 102 via client computing device 104, they are forwarded to a landing page with a list of vehicles with unauthorized or unclaimed license plate data. The user can then claim one or more vehicles that are then associated with their profile.

Notification module 114 can be configured to transmit a notification to a user of the system or member of the community when a suspicious vehicle is determined. A user can be grouped based on a community and notification module 114 can be configured to transmit notifications to the members of that community only. In one embodiment, notification module 114 can also can be configured to transmit images of unidentified license plates arriving to a community.

System 100 can also include License Plate Recognition (LPR) Camera(s) 118 that is coupled to server(s) 102. In one embodiment, server(s) 102 can receive vehicle license plate data from LPR camera(s) 118. LPR Camera 118 can be configured to determine the license plate data (also referred to herein as license plate number), which is an alpha numeric string, using optical camera recognition (OCR) technology and transmit the data to server(s) 102. By way of non-limiting example, LPR camera(s) 118 can be capable of capturing image data to an image sensor using at least one of a CCD (charge-coupled device) and/or CMOS (complementary metal-oxide semiconductor) to convert light into electrons, and a filter for obtaining the image which is then OCR-ed to determine the license plate data. LPR camera(s) 118 can perform a mechanical or electronic conversion of images of a vehicle license plate to extract the vehicle license plate data.

LPR camera(s) 118 can be placed at any location from where it can capture the license plate data of vehicles entering or exiting the community (e.g., entry and exit points/gates/streets etc.). LPR camera(s) 118 can capture the license plate image that can be transmitted to server(s) 102 using a file transfer mechanism (e.g., Secured File Transfer Protocol (SFTP)).

Vehicle status determination module 112 can, in one embodiment, tag an image received from LPR camera(s) 118 using camera setup properties. As soon as vehicle enters or exits a community, LPR Camera(s) 118 can OCR the license plate data and transmit it to server(s) 102. If the retrieved license plate data is determined to be of a known vehicle, system 100 can be configured to not take any action.

If however, a vehicle is determined to be unidentified on entry, yet does not exit within a predetermined threshold time (configured by an administrative user of the community or server(s) 102) the vehicle information is transmitted to users in the community using notification module 114 as a push notification, email, text, or a combination thereof.

If a vehicle belongs to the community member who did not associate a vehicle with their profile and the vehicle surpasses the predetermined threshold time, the notification transmitted by the system can include options like "Claim Vehicle" or "Claim as guest".

In some embodiments, server(s) 102, client computing platform(s) 104, and/or external resources 116 can be operatively linked via one or more electronic communication links. For example, such electronic communication links can be established, at least in part, via a network such as the Internet and/or other networks. It will be appreciated that this is not intended to be limiting, and that the scope of this disclosure includes embodiments in which server(s) 102, client computing platform(s) 104, and/or external resources 118 can be operatively linked via some other communication media.

A given client computing platform 104 may include one or more processors configured to execute computer program modules. The computer program modules can be configured to enable a user associated with the given client computing platform 104 to interface with system 100 and/or external resources 116, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 116 may include sources of information outside of system 100, external entities participating with system 100, and/or other resources. In some embodiments, some or all of the functionality attributed herein to external resources 116 can be provided by resources included in system 100.

Server(s) 102 may include electronic storage 120, one or more processors 122, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 can be implemented by a cloud of computing platforms operating together as server(s) 102.

Electronic storage 120 may comprise non-transitory storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from client computing platform(s) 104, and/or other information that enables server(s) 102 to function as described herein.

Processor(s) 122 can be configured to provide information processing capabilities in server(s) 102. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some embodiments, processor(s) 122 may include a plurality of processing units. These processing units can be physically located within the same device, or processor(s) 122 may represent processing functionality of a plurality of devices operating in coordination. At least one of processor(s) 122 can be configured to execute modules 108, 110, 112, 114, 116, 118, and/or other modules by software; hardware; firmware; some combination of software, hardware, and/or firmware; and/or other mechanisms for configuring processing capabilities on processor(s) 122.

As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, and 114 are illustrated in FIG. 1 as being implemented within a single processing unit, in embodiments in which processor(s) 122 includes multiple processing units, one or more of modules 108, 110, and/or 114 can be implemented remotely from the other modules.

The description of the functionality provided by the different modules 108, 110, 112, 114, 116, and/or 118 described below is for illustrative purposes, and is not intended to be limiting, as any of modules 108, 110, 112, and/or 114 may provide more or less functionality than is described. For example, one or more of modules 108, 110, 112, and/or 114 can be eliminated, and some or all of its functionality can be provided by other ones of modules 108, 110, 112, and/or 114. As another example, processor(s) 122 can be configured to execute one or more additional modules that may perform some or all of the functionality attributed below to one of modules 108, 110, 112, and/or 114.

Figure 2:
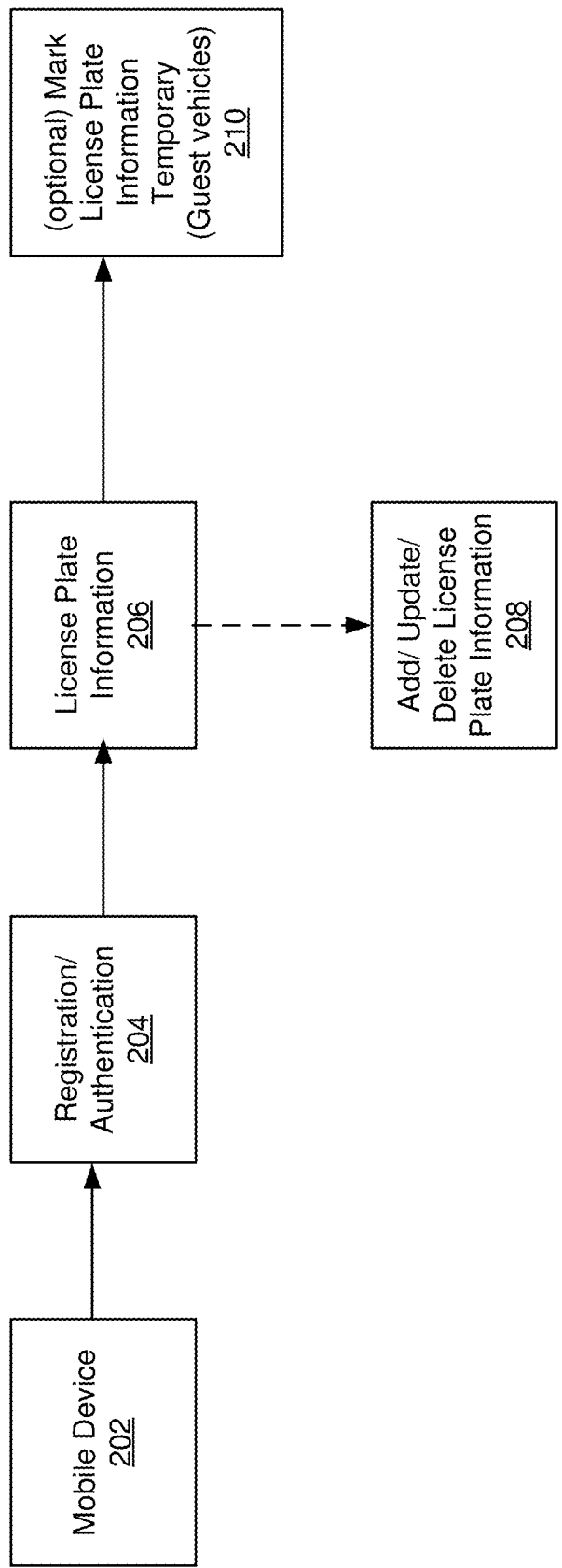
FIG. 2 illustrates a block diagram of a community user's control flow, according to one embodiment of the present invention.

FIG. 2 illustrates a block diagram of a community user's control flow, according to one embodiment of the present invention. Block 202 represents client computing device platform 104 which can be a mobile device. When the user attempts access to resources of server(s) 102, they are prompted to register and/or authenticate at block 204. At block 206, the user is presented a list of license plate numbers that are associated with their profiles. In one embodiment, the user is also presented with a list of vehicles with unauthorized or unclaimed license plate data that can be claimed and associated with their profile. At block 208, the user can add, update, or delete license plate data associated with their account. At block 210, the user is provided an opportunity to associate license plate numbers temporarily to their accounts by tagging them as guest vehicles.

In one embodiment, notification module 114 can send alerts of unregistered/unclaimed vehicles for which the push notification has not been sent yet to the registered community users. A registered user can then log on to the system to claim the vehicle as their own or tag it as a guest vehicle as described herein. Vehicles can be claimed by the registered users by clicking on a "Claim" button against each license plate number in the unclaimed list page which, in one embodiment, can be a landing page. The user can claim a vehicle as an owner or guest. When a vehicle is claimed as an owner, the vehicle is associated with the user profile using the following attributes: a user identifier identifying the user, the license plate number, a community identifier, and a vehicle identifier. A claimed vehicle table is also maintained in which the user identifier for the claimed vehicle and expiration time are provided. The expiration time is set to null when a vehicle is claimed as owner. When a user claims a vehicle as a guest the claim vehicle table sets the expiration time when the guest is expected to leave. In one embodiment, when a user claims a vehicle as guest, the system prompts the user to enter a date and/or time when the guest is expected to leave. Once the guest leaves, the user's association with the guest vehicle is removed.

Figure 3:
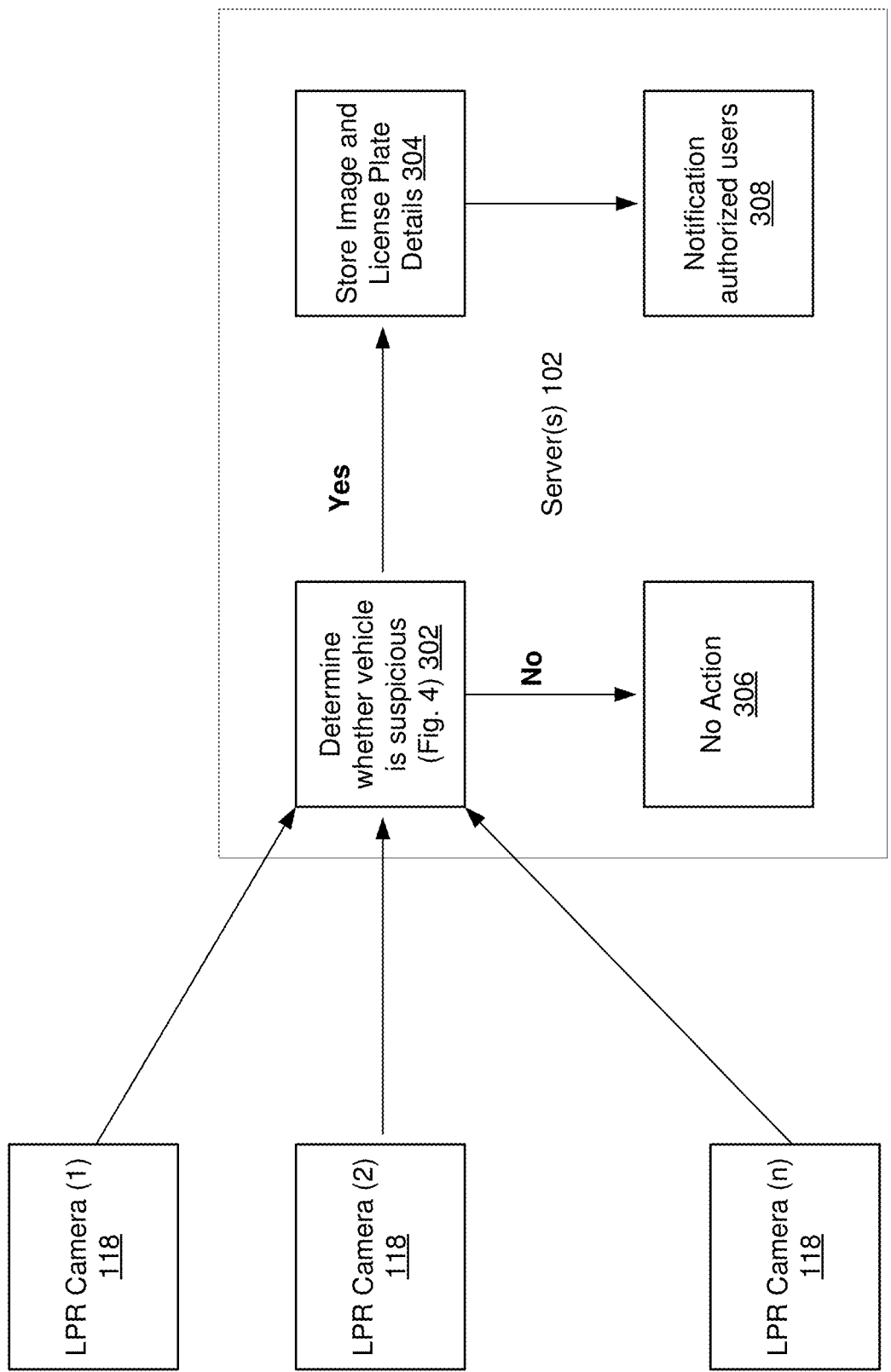
FIG. 3 illustrates a block diagram showing the operations of a system, according to one embodiment of the present invention.

FIG. 3 illustrates a block diagram showing the operations of a system, according to one embodiment of the present invention. As illustrated, server(s) 102 can receive license plate data/numbers from one or more LPR camera(s) 118. As illustrated at block 302, server(s) 102 determines whether a vehicle is marked as suspicious as further illustrated in FIG. 4 and its corresponding disclosure. A suspicious vehicle, as described herein, can be any vehicle that has been unidentified or unclaimed. If the vehicle is not determined as suspicious, as illustrated at block 306, no action is taken. If however, the vehicle is determined to be suspicious, as illustrated at block 304, license plate details, and optionally images, of the unidentified or unclaimed vehicle are stored in a data store (e.g., electronic storage 120). Thereafter, one or more users of a community are notified of the suspicious vehicles (using notification module 114) as illustrated by block 308.

Figure 4:
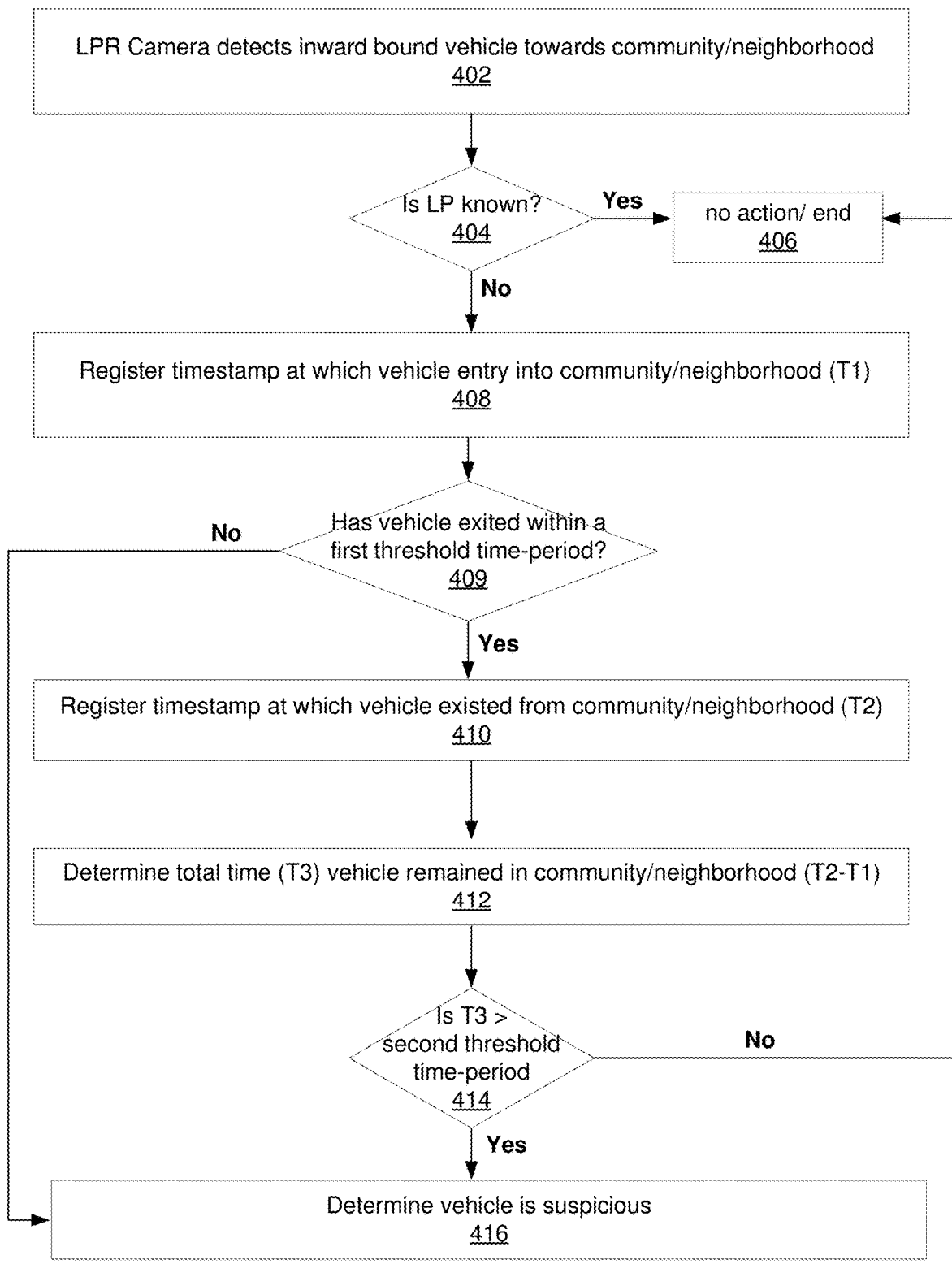
FIG. 4 illustrates a flowchart of determining whether a vehicle is to be tagged as suspicious, according to one embodiment of the invention.

FIG. 4 illustrates a flowchart of determining whether a vehicle is to be tagged as suspicious, according to one embodiment of the invention. As illustrated, at 402, once the LPR camera detects a vehicle enters the community and sends the image and license plate data to the server using an API. At 404, the license plate number is queried against a known set of license plate data belonging to the community. Based on the result of the query if the license plate is not found in the database, it is determined that the vehicle is not registered with the community and is not registered with any owner or claimed as a guest vehicle. If however, the license plate number is found in the set retrieved from the database, then no action is taken and control terminates as illustrated at 406.

At 408, if the vehicle is not determined in the set, an entry is registered in a table with the timestamp the vehicle entered into the community. At 409, if the vehicle exited within a first pre-defined threshold, at 410, a record is registered with the time at which the vehicle exited. If however, the vehicle does not exit within the first pre-defined threshold, control is passed on to 416 and the vehicle is determined to be suspicious. If the vehicle exited within the first predetermined threshold, at 412, the total time the vehicle remained in the community is determined. At 414, if the total time is determined to be more than a second pre-determined threshold, control passes to 416 where the vehicle is determined to be suspicious.

If, however, the total time the vehicle remained in the community is determined to be less than the second pre-determined threshold time-period, control passes back to 406 where no action is taken and control of the program terminates.

At least one of the following information related to a suspicious vehicle is determined and stored electronically: a license plate number, an image received from the LPR camera, community identifier where the cameras are registered, an 'in' camera identifier which detected the entry of the vehicle in the community, an 'out' camera identifier which detects the exit of the vehicle, an 'in' time representing the timestamp the vehicle entered, an 'out' time representing the timestamp the vehicle exited the community, and/or a claim identifier for the suspicious vehicle.

Figure 5:
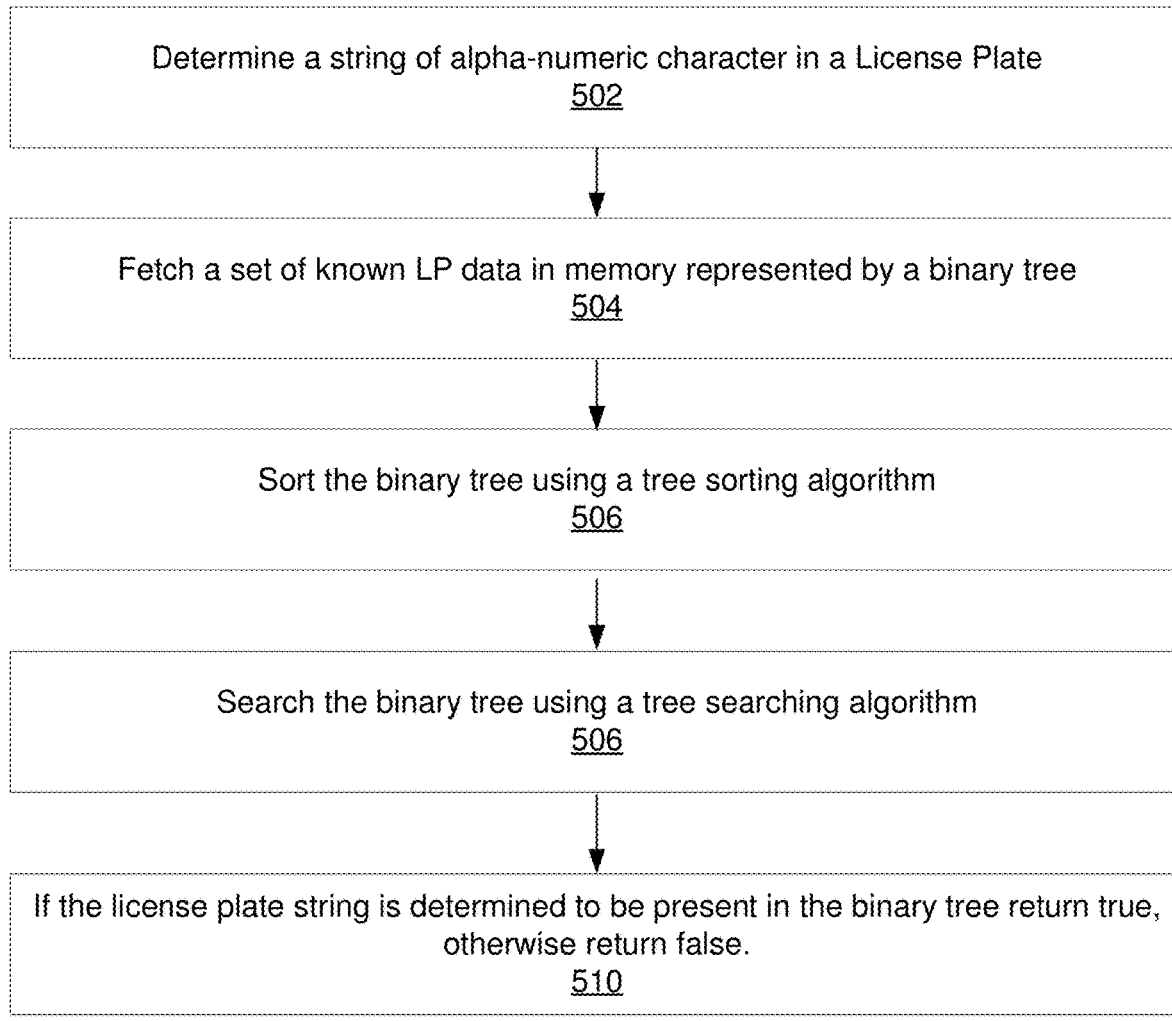
FIG. 5 illustrates a flowchart of determining whether a vehicle is claimed and associated with a user's profile.

FIG. 5 illustrates a flowchart of determining whether a vehicle is claimed and associated with a user's profile. Once a vehicle enters the community and its license plate information is sent to the server using an API, at 502, the string of alpha-numeric characters of the license plate is determined. At 504, a set of known license plate data is retrieved/fetched from a schema object and stored in memory where it is represented by a binary tree. At 506, the binary tree is sorted using a tree sorting algorithm. In one embodiment, the license plate data is used as the indices to find whether the entered vehicle is in the binary tree. At 508, the binary tree is searched, using a tree searching algorithm, to determine whether the entered vehicle is within the set of known vehicle data.

In one embodiment, the binary search algorithm divides the complete data set in the table equally in cache. Thereafter, using the indices it attempts to find if this license plate information lies before the mid-point or after the mid-point of the sorted dataset. The dataset is then recursively divided again into two halves until the final decision returns a binary code for the license plate number if determined to be present in the schema, or null is it is not found.

In one embodiment, as illustrated at 510, if the license plate data is found in the binary tree a Boolean true (represented by a numeric 1) is transmitted, and when the license plate data is not found a Boolean false (represented by a numeric 0) is transmitted to the decision server in the Application server module.

Figure 6:
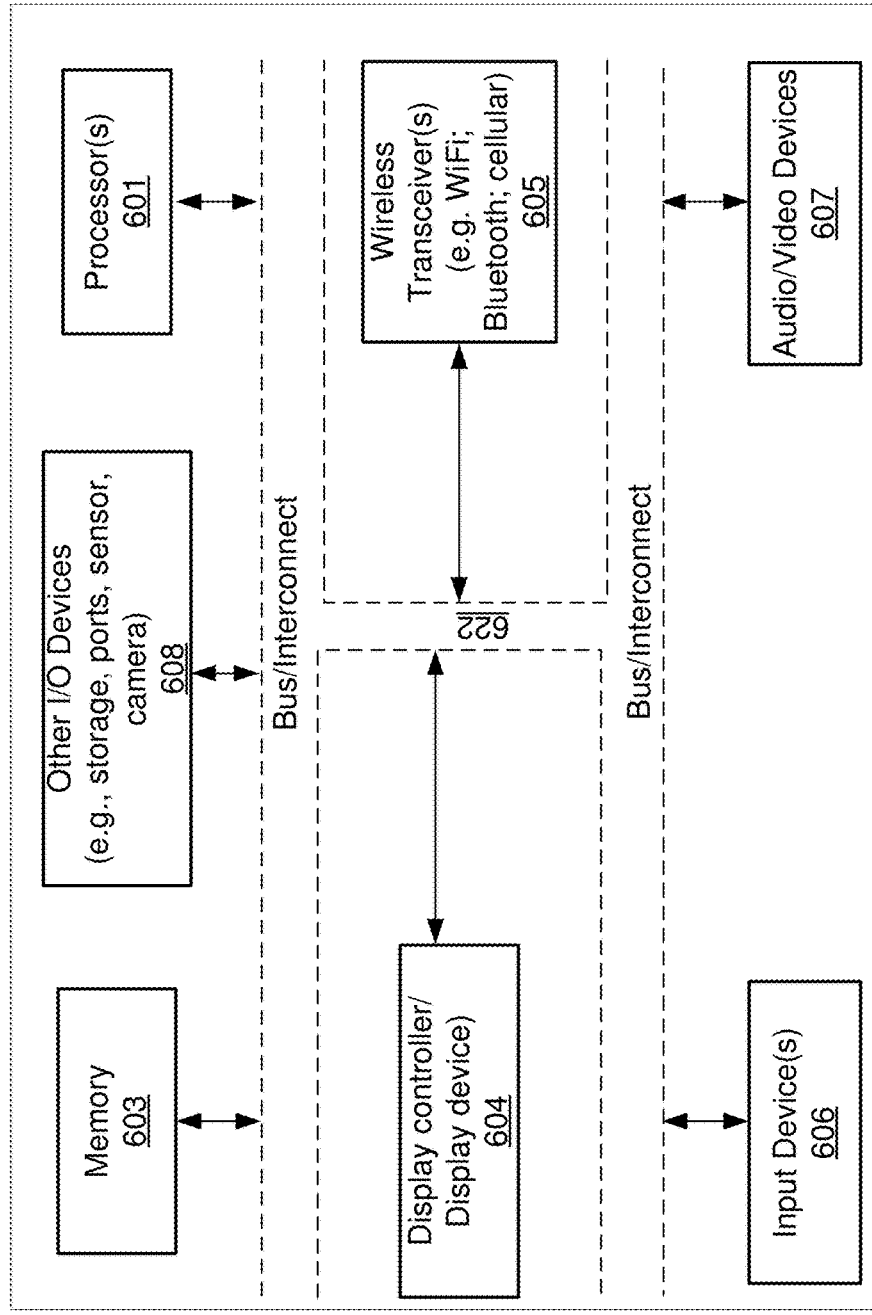
FIG. 6 is a block diagram illustrating a data processing system such as a computing system which may be used with one embodiment of the invention.

FIG. 6 is a block diagram illustrating a data processing system such as a computing system 600 which may be used with one embodiment of the invention. For example, system 600 can be implemented as part of system 100. It should be apparent from this description that aspects of the present invention can be embodied, at least in part, in software. That is, the techniques may be carried out in a computer system or other computer system in response to its processor, such as a microprocessor, executing sequences of instructions contained in memory, such as a ROM, DRAM, mass storage, or a remote storage device. In various embodiments, hardware circuitry may be used in combination with software instructions to implement the present invention. Thus, the techniques are not limited to any specific combination of hardware circuitry and software nor to any particular source for the instructions executed by the computer system. In addition, throughout this description, various functions and operations are described as being performed by or caused by software code to simplify description. However, those skilled in the art will recognize what is meant by such expressions is that the functions result from execution of the code by a processor.

In one embodiment, system 600 can represent server(s) 102. System 600 can have a distributed architecture having a plurality of nodes coupled through a network, or all of its components may be integrated into a single unit. Computing system 600 can represent any of the data processing systems described above performing any of the processes or methods described above. In one embodiment, computer system 600 can be implemented as integrated circuits (ICs), discrete electronic devices, modules adapted to a circuit board such as a motherboard, an add-in card of the computer system, and/or as components that can be incorporated within a chassis/case of any computing device. System 600 is intended to show a high level view of many components of any data processing unit or computer system. However, it is to be understood that additional or fewer components may be present in certain embodiments and furthermore, different arrangement of the components shown may occur in other embodiments. System 600 can represent a desktop, a laptop, a tablet, a server, a mobile phone, a programmable logic controller, a personal digital assistant (PDA), a personal communicator, a network router or hub, a wireless access point (AP) or repeater, a set-top box, or a combination thereof.

In one embodiment, system 600 includes processor 601, memory 603, and devices 605-608 via a bus or an interconnect 622. Processor 601 can represent a single processor or multiple processors with a single processor core or multiple processor cores included therein. Processor 601 can represent one or more general-purpose processors such as a microprocessor, a central processing unit (CPU), Micro Controller Unit (MCU), etc. Processor 601 can be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 601, can also be a low power multi-core processor socket such as an ultra low voltage processor, may act as a main processing unit and central hub for communication with the various components of the system. Such processor can be implemented as a system on chip (SoC).

Processor 601 is configured to execute instructions for performing the operations and methods discussed herein. System 600 further includes a graphics interface that communicates with graphics subsystem 604, which may include a display controller and/or a display device. Processor 601 can communicate with memory 603, which in an embodiment can be implemented via multiple memory devices to provide for a given amount of system memory. In various embodiments the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector. Memory 603 can be a machine readable non-transitory storage medium such as one or more volatile storage (or memory) devices such as random access memory (RAM), dynamic RAM (DRAM), synchronous DRAM (SDRAM), static RAM (SRAM), or other types of storage devices such as hard drives and flash memory. Memory 603 may store information including sequences of executable program instructions that are executed by processor 601, or any other device. System 600 can further include IO devices such as devices 605-608, including wireless transceiver(s) 605, input device(s) 606, audio IO device(s) 607, and other IO devices 608.

Wireless transceiver 605 can be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, network interfaces (e.g., Ethernet interfaces) or a combination thereof. Input device(s) 606 can include a mouse, a touch pad, a touch sensitive screen (which may be integrated with display device 604), a pointer device such as a stylus, and/or a keyboard (e.g., physical keyboard or a virtual keyboard displayed as part of a touch sensitive screen). Other optional devices 608 can include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 608 can further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors can be coupled to interconnect 622 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, in one embodiment, a mass storage (not shown) may also couple to processor 601. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on RE-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Note that while system 600 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:

1. A method, comprising:
receiving, by a computer, a license plate data of a vehicle;
fetching indices of a set of known license plate data from a schema object, wherein the set includes vehicle license plate information of a plurality of vehicles, wherein the set is represented by a binary tree in memory;
sorting the binary tree using a tree sorting algorithm;
searching the binary tree using a tree searching algorithm to determine whether the license plate data is found in the binary tree; and
determining that the vehicle is not known when the license plate data is not found in the binary tree, otherwise determining the vehicle to be known, wherein determining that the vehicle is known includes a prior association of the vehicle with a profile of a registered user, the prior association including a tag, wherein the tag indicates whether the vehicle belongs to the registered user or to a guest of the registered user;
wherein the registered user is presented a list of vehicles that have not been associated with the profile of any registered user, and wherein the registered user can associate one or more vehicles from the list of vehicles with the profile of the registered user, and wherein the method is used to safeguard a neighborhood or community.

2. The method of claim 1, further comprising:
storing a timestamp, wherein the timestamp signifies entry of the vehicle in the neighborhood or community;
determining that the vehicle has not exited the neighborhood or community within a first predetermined threshold time period;
transmitting the license plate data of the vehicle to a user device.

3. The method of claim 1, further comprising:
storing a first timestamp value, wherein the first timestamp signifies a time of entry of the vehicle in the neighborhood or community;
determining that the vehicle has exited the neighborhood or community within a first predetermined threshold time period;
storing a second timestamp value, wherein the second timestamp value signifies a time of exit of the vehicle from the neighborhood or community;
determining a total time the vehicle remained in the neighborhood or community;
transmitting the license plate data of the vehicle to a user device when the total time exceeds a second predetermined threshold time period.

4. The method of claim 1, further comprising:
presenting the registered user the option to claim the vehicle.

5. The method of claim 4, wherein the user can temporarily claim the vehicle as a guest vehicle.

6. The method of claim 4, wherein the user can add, delete, or modify license plate data of vehicles associated with the profile of the user.

7. The method of claim 4, wherein to authenticate the user, a 32-byte Secure Hash Algorithm (SHA-256) based cryptographic hash token is generated and transmitted to the user.

8. A non-transitory computer readable medium comprising instructions which when executed by a processing system performs a method, comprising:
receiving a license plate data of a vehicle;
fetching indices of a set of known license plate data from a schema object, wherein the set includes vehicle license plate information of a plurality of vehicles, wherein the set is represented by a binary tree in memory;
sorting the binary tree using a tree sorting algorithm;
searching the binary tree using a tree searching algorithm to determine whether the license plate data is found in the binary tree; and
determining that the vehicle is not known when the license plate data is not found in the binary tree, otherwise determining the vehicle to be known, wherein determining that the vehicle is known includes a prior association of the vehicle with a profile of a registered user, the prior association including a tag, wherein the tag indicates whether the vehicle belongs to the registered user or to a guest of the registered user;
wherein the registered user is presented a list of vehicles that have not been associated with the profile of any registered user, and wherein the registered user can associate one or more vehicles from the list of vehicles with the profile of the registered user, and wherein the method is used to safeguard a neighborhood or community.

9. The non-transitory computer readable medium of claim 8, further comprising:
storing a timestamp, wherein the timestamp signifies entry of the vehicle in the neighborhood or community;
determining that the vehicle has not exited the neighborhood or community within a first predetermined threshold time period;
transmitting the license plate data of the vehicle to a user device.

10. The non-transitory computer readable medium of claim 8, further comprising:
storing a first timestamp value, wherein the first timestamp signifies a time of entry of the vehicle in the neighborhood or community;
determining that the vehicle has exited the neighborhood or community within a first predetermined threshold time period;
storing a second timestamp value, wherein the second timestamp value signifies a time of exit of the vehicle from the neighborhood or community;
determining a total time the vehicle remained in the neighborhood or community;
transmitting the license plate data of the vehicle to a user device when the total time exceeds a second predetermined threshold time period.

11. The non-transitory computer readable medium of claim 8, further comprising:
presenting a user the option to claim the vehicle.

12. The non-transitory computer readable medium of claim 11, wherein the user can temporarily claim the vehicle as a guest vehicle.

13. The non-transitory computer readable medium of claim 11, wherein the user can add, delete, or modify license plate data of vehicles associated with the profile of the user.

14. The non-transitory computer readable medium of claim 11, wherein to authenticate the user, a 32-byte Secure Hash Algorithm (SHA-256) based cryptographic hash token is generated and transmitted to the user.

15. A system, comprising:

a memory device;

a processing system comprising at least one hardware core coupled to the memory device, wherein the processing system is configured to:

receive a license plate data of a vehicle;

fetch indices of a set of known license plate data from a schema object, wherein the set includes vehicle license plate information of a plurality of vehicles, wherein the set is represented by a binary tree in memory;

sort the binary tree using a tree sorting algorithm;

search the binary tree using a tree searching algorithm to determine whether the license plate data is found in the binary tree; and determine that the vehicle is not known when the license plate data is not found in the binary tree, otherwise determine the vehicle to be known, wherein to determine that the vehicle is known includes a prior association of the vehicle with a profile of a registered user, the prior association including a tag, wherein the tag indicates whether the vehicle belongs to the registered user or to a guest of the registered user;

wherein the registered user is presented a list of vehicles that have not been associated with the profile of any registered user, and wherein the registered user can associate one or more vehicles from the list of vehicles with the profile of the registered user, and wherein the system is used to safeguard a neighborhood or community.

16. The system of claim 15, further configured to:

store a timestamp, wherein the timestamp signifies entry of the vehicle in the neighborhood or community;

determine that the vehicle has not exited the neighborhood or community within a first predetermined threshold time period;

transmit the license plate data of the vehicle to a user device.

17. The system of claim 15, further configured to:

store a first timestamp value, wherein the first timestamp signifies a time of entry of the vehicle in the neighborhood or community;

determine that the vehicle has exited the neighborhood or community within a first predetermined threshold time period;

store a second timestamp value, wherein the second timestamp value signifies a time of exit of the vehicle from the neighborhood or community;

determine a total time the vehicle remained in the neighborhood or community;

transmit the license plate data of the vehicle to a user device when the total time exceeds a second predetermined threshold time period.

18. The system of claim 15, further configured to:

present a user the option to claim the vehicle, and wherein the user can temporarily claim the vehicle as a guest vehicle.

19. The system of claim 18, wherein the user can add, delete, or modify license plate data of vehicles associated with the profile of the user.

20. The system of claim 18, wherein to authenticate the user, a 32-byte Secure Hash Algorithm (SHA-256) based cryptographic hash token is generated and transmitted to the user.

* * * * *